US012803642B2

(12) United States Patent
He et al.

(10) Patent No.: US 12,803,642 B2
(45) Date of Patent: Nov. 17, 2026

(54) SYSTEMS AND METHODS FOR DETERMINING BEAM FAILURE RECOVERY INFORMATION

(71) Applicant: ZTE CORPORATION, Shenzhen (CN)

(72) Inventors: Zhen He, Shenzhen (CN); Bo Gao, Shenzhen (CN); Chuangxin Jiang, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 558 days.

(21) Appl. No.: 18/205,234

(22) Filed: Jun. 2, 2023

(65) Prior Publication Data

US 2023/0318783 A1 Oct. 5, 2023

Related U.S. Application Data

(63) Continuation of application No. PCT/CN2021/071824, filed on Jan. 14, 2021.

(51) Int. Cl.

*H04B 7/06* (2006.01)
*H04L 5/00* (2006.01)

(Continued)

(52) U.S. Cl.

CPC ....... *H04B 7/06964* (2023.05); *H04L 5/0051* (2013.01); *H04W 16/28* (2013.01); *H04W 72/231* (2023.01)

(58) Field of Classification Search

CPC .............. H04B 7/06964; H04B 7/0626; H04B 7/0621; H04B 7/088; H04B 7/06968; H04L 5/0051; H04L 5/0023; H04L 5/005; H04L 5/0053; H04L 1/1812; H04L 5/0048; H04L 27/26025; H04W 16/28; H04W 72/231;

(Continued)

(56) References Cited

U.S. PATENT DOCUMENTS

2019/0190582 A1* 6/2019 Guo .................... H04B 17/327
2019/0320469 A1 10/2019 Huang et al.

(Continued)

FOREIGN PATENT DOCUMENTS

CN 110661556 A 1/2020
CN 111869127 A 10/2020

(Continued)

OTHER PUBLICATIONS

Extended European Search Report on EP Appl No. 21918395.1, dated Dec. 1, 2023 (15 pages).

(Continued)

*Primary Examiner* — Kiet Tang

(74) *Attorney, Agent, or Firm* — Foley & Lardner LLP

(57) ABSTRACT

Presented are systems and methods for determining beam failure recovery information. A wireless communication device may receive a first activation signaling that includes a first information from a wireless communication node. The wireless communication device may determine at least a q0 or a q1, according to the first information. The q0 may comprise a list of reference signals (RSs) for assessing radio link quality. The q1 may comprise a list of RSs for determining a RS to be reported.

14 Claims, 8 Drawing Sheets

600

(51) Int. Cl.
*H04W 16/28* (2009.01)
*H04W 72/231* (2023.01)

(58) Field of Classification Search
CPC ............. H04W 24/08; H04W 72/0457; H04W 72/1268; H04W 72/232
See application file for complete search history.

(56) References Cited

U.S. PATENT DOCUMENTS

| | | | | |
|---|---|---|---|---|
| 2022/0131591 | A1* | 4/2022 | Huang | H04W 24/08 |
| 2025/0193069 | A1* | 6/2025 | Ryu | H04L 41/0677 |

FOREIGN PATENT DOCUMENTS

| | | | |
|---|---|---|---|
| EP | 3 745 759 | A1 | 12/2020 |
| WO | WO-2020/033549 | A1 | 2/2020 |
| WO | WO-2020/096852 | A1 | 5/2020 |

OTHER PUBLICATIONS

Catt, "Summary on beam management for simultaneous multi-TRP transmission with multiple Rx panels," 3GPP TSG RAN WG1 Meeting #103-e, R1-2009500, Oct. 26, 2020, e-Meeting (40 pages).

Intel Corporation, "Issue Summary for physical layer changes for supporting NR from 52.6 GHz to 71 GHz," 3GPP TSG RAN WG1 Meeting #102-e, R1-2006982, Aug. 17, 2020, e-Meeting (16 pages).

International Search Report and Written Opinion for PCT Appl. No. PCT/CN2021/071824, mailed Oct. 15, 2021 (7 pages).

Lenovo, et al., "Enhancements on beam management for multi-TRP", 3GPP TSG RAN WG1 Meeting #102-e, R1-2008913, Oct. 26, 2020, e-Meeting (8 pages).

Mediatek Inc.: "Summary 3 on Remaing issues on Beam Failure Recovery" 3GPP TSG RAN WG1 Meeting #92bis; R1-1805730; Apr. 20, 2018; Sanya, China (25 pages).

Nokia, et al., "Enhancements on Beam Management for Multi-TRP/ Panel Transmission," 3GPP TSG RAN WG1 #102-e, R1-2006846, Aug. 17, 2020, e-Meeting (8 pages).

Nokia, et al., "Enhancements on Beam Management for Multi-TRP/ Panel Transmission," 3GPP TSG RAN WG1 #103-e Meeting, R1-2008906, Oct. 26, 2020 (11 pages).

Oppo, "Enhancements on beam management for multi-TRP," 3GPP TSG RAN WG1 #103-e, R1-2008220, Oct. 26, 2020, e-Meeting (3 pages).

Sony, "Considerations on beam management for multi-TRP," 3GPP TSG RAN WG1 #102e, R1-2005563, Aug. 17, 2020, e-Meeting (6 pages).

Sony, "Considerations on beam management for multi-TRP," 3GPP TSG RAN WG1 #103e, R1-2008349, Oct. 26, 2020, e-Meeting (7 pages).

Office Action for KR Appl. No. 10-2023-7019345, dated Aug. 6, 2025 (with English translation, 7 pages).

* cited by examiner

300

| RS in q0 or q1 | TCI codepoint | Activated TCI state ID |
|---|---|---|
| BFD/NBI RS 1 | 000 | 5 |
| BFD/NBI RS 2 | 001 | 8 |
| | 010 | 15 |
| | 100 | 24 |
| | 011 | 65 |
| | 101 | 78 |
| | 110 | 89 |
| | 111 | 115 |

FIG. 3

400

| RS in q0 or q1 | TCI codepoint | Activated TCI state ID |
|---|---|---|
| BFD/NBI RS 1 | 000 | 5,9 |
| BFD/NBI RS 2 | 001 | 8,12 |
| | 010 | 15 |
| | 100 | 24 |
| | 011 | 65 |
| | 101 | 78 |
| | 110 | 89 |
| | 111 | 115 |

FIG. 4

SYSTEMS AND METHODS FOR DETERMINING BEAM FAILURE RECOVERY INFORMATION

CROSS-REFERENCE TO RELATED APPLICATION

This application claims the benefit of priority under 35 U.S.C. § 120 as a continuation of International Patent Application No. PCT/CN2021/071824, filed on Jan. 14, 2021, the disclosure of which is incorporated herein by reference in its entirety.

TECHNICAL FIELD

The disclosure relates generally to wireless communications, including but not limited to systems and methods for determining beam failure recovery information.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a first activation signaling that includes a first information from a wireless communication node. The wireless communication device may determine at least a q0 or a q1, according to the first information. The q0 may comprise a list of reference signals (RSs) for assessing radio link quality. The q1 may comprise a list of RSs for determining a RS to be reported.

In some embodiments, the first activation signaling may comprise a medium access control control element (MAC CE) signaling or a downlink control information (DCI) signaling. In some embodiments, the first information may include at least one of: an indication of a first RS, at least one beam state, or at least one codepoint. In some embodiments, the first RS may comprise at least one of: a downlink (DL) RS, a periodic RS, a single-port RS, a two-port RS, a channel state information reference signal (CSI-RS), a synchronization signal block (SSB), or a RS with frequency density equal to 1 or 3 resource elements (REs) per resource block (RB). In some embodiments, the at least one beam state may be applied to at least one of: a physical downlink shared channel (PDSCH), a physical downlink control channel (PDCCH), or a channel state information reference signal (CSI-RS). In some embodiments, the wireless communication device may determine the q0 or the q1 according to N beam states from the at least one beam state, wherein N is an integer value of at least 1.

In some embodiments, the N beam states may comprise beam states with N lowest identifiers (IDs). In some embodiments, the N beam states may be selected or indicated from the at least one beam state via a medium access control control (MAC-CE) signaling or a downlink control information (DCI) signaling. In some embodiments, the wireless communication device may determine the q0 or the q1 according to one or more quasi co-located (QCL) RSs in the N beam states from the at least one beam state. In some embodiments, the value of N or the maximum value of N may be determined according to a UE capability signaling or may be indicated via a medium access control control (MAC-CE) signaling or a radio resource control (RRC) signaling. In some embodiments, the wireless communication device may determine the q0 or q1 according to one or more beam states corresponding to M codepoints from the at least one codepoint, wherein M is an integer value of at least 1, and the q0 or the q1 is associated with the at least one codepoint. In some embodiments, the q0 or the q1 may be associated with the at least one codepoint.

In some embodiments, the M codepoints may comprise codepoints with M lowest bit values. In some embodiments, the M codepoints may be selected or indicated from the at least one codepoint via a medium access control control (MAC-CE) signaling or a downlink control information (DCI) signaling. In some embodiments, the value of M or the maximum value of M may be determined according to a signaling indicating UE capability, or may be indicated via a medium access control control (MAC-CE) signaling or a radio resource control (RRC) signaling. In some embodiments, the at least one beam state may comprise a beam state with a lowest identifier (ID) corresponding to the at least one codepoint. In some embodiments, the at least one beam state may include a Pth beam state corresponding to the at least one codepoint, wherein P may be determined according to a first index associated with the q0 or the q1.

In some embodiments, the wireless communication device may determine the q0 or the q1 according to one or more quasi co-located (QCL) RSs in the one or more beam states corresponding to the M codepoints. In some embodiments, the q0 or the q1 may be associated with a first index. In some embodiments, the first information may be associated with the first index. In some embodiments, the q0 or the q1 may be determined according to the first information. In some embodiments, the first index may include at least a control resource set (CORESET) group index. In some embodiments, the q0 or the q1 may be associated with a first index. In some embodiments, the wireless communication device may report the RS from the q1, wherein the RS may be associated with the first index. In some embodiments, the wireless communication device may monitor a physical downlink control channel (PDCCH) in all control resource sets (CORESETs) associated with the first index using a same antenna port quasi co-location (QCL) parameters as those associated with the RS. In some embodiments, the wireless communication device may transmit the PUCCH associated with the first index using a same spatial domain filter as that corresponding to the RS.

In some embodiments, the q0 may be associated with a second index. In some embodiments, a first list of RSs may be associated with the second index. In some embodiments, the wireless communication device may determine the first list of RSs according to the q0. In some embodiments, the wireless communication device may determine the q1 according to the first list of RSs. In some embodiments, the q0 or q1 may be applied to a first component carrier (CC). In some embodiments, when a quasi-co-location (QCL)-TypeD RS in the at least one beam state is in a second CC and the second CC is different from the first CC, the q0 or the q1 may be determined according to a QCL-TypeA RS in the at least one beam state. In some embodiments, the wireless communication device may transmit a physical uplink control channel (PUCCH) with hybrid automatic repeat request acknowledgement (HARQ-ACK) information in a slot n corresponding to a physical downlink shared channel (PDSCH) carrying the first activation signaling. In some embodiments, the wireless communication device may apply the list of RSs in the q0 or the q1 starting from a first slot that is after slot $$n + 3N_{slot}^{subframe,\mu}$$

in a subframe, wherein μ is a subcarrier spacing (SCS) configuration for the PUCCH, and N is a number of slots in the subframe.

In some embodiments, after 28 symbols from a last symbol of a physical downlink control channel (PDCCH) reception with a downlink control information (DCI) scheduling a physical uplink shared channel (PUSCH) transmission with a same HARQ process number as for a transmission of a first PUSCH and having a toggled new data indicator (NDI) field value, the wireless communication device may monitor PDCCH occasions in all control resource sets (CORESETs) on one or more secondary cells (SCells) indicated by a medium access control control element (MAC CE) using a same antenna port quasi co-location parameters as those associated with the RS. In some embodiments, the wireless communication device may transmit PUCCH on a PUCCH-SCell using a same spatial domain filter as that corresponding to the RS. In some embodiments, a subcarrier spacing (SCS) configuration for the 28 symbols may be a smallest of SCS configurations of an active downlink (DL) bandwidth part (BWP) for the PDCCH reception and of one or more active DL BWPs of the SCells indicated by the MAC-CE.

At least one aspect is directed to a system, method, apparatus, or a computer-readable medium. A wireless communication node may transmit a first activation signaling that includes a first information to a wireless communication device. In some embodiments, the wireless communication node may cause the wireless communication device to determine at least a q0 or a q1, according to the first information. The q0 may comprise a list of reference signals (RSs) for assessing radio link quality. The q1 may comprise a list of RSs for determining a RS to be reported.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 3-4 illustrate various example associations between the q0 and/or q1 and at least one TCI codepoint, in accordance with some embodiments of the present disclosure;

DETAILED DESCRIPTION

1 Mobile Communication Technology and Environment

Figure 1:
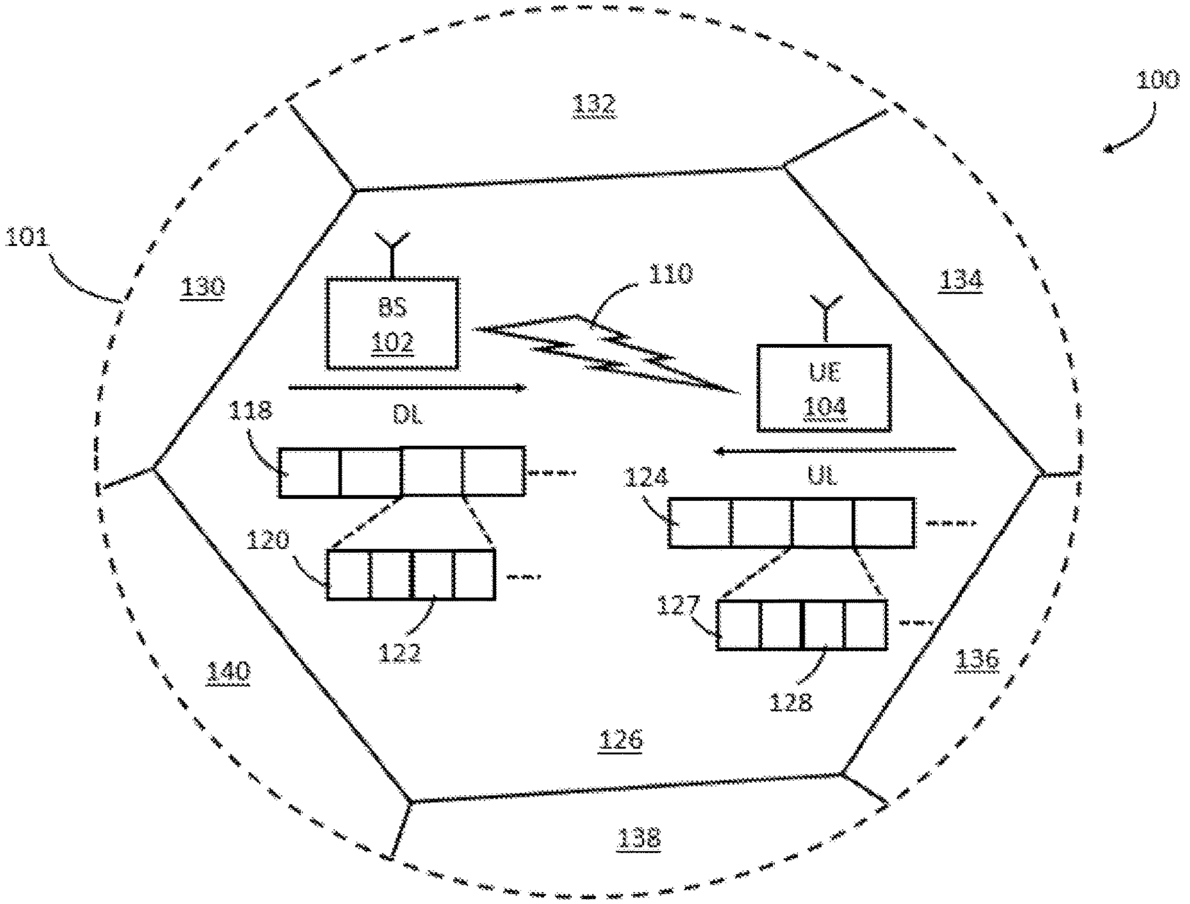
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
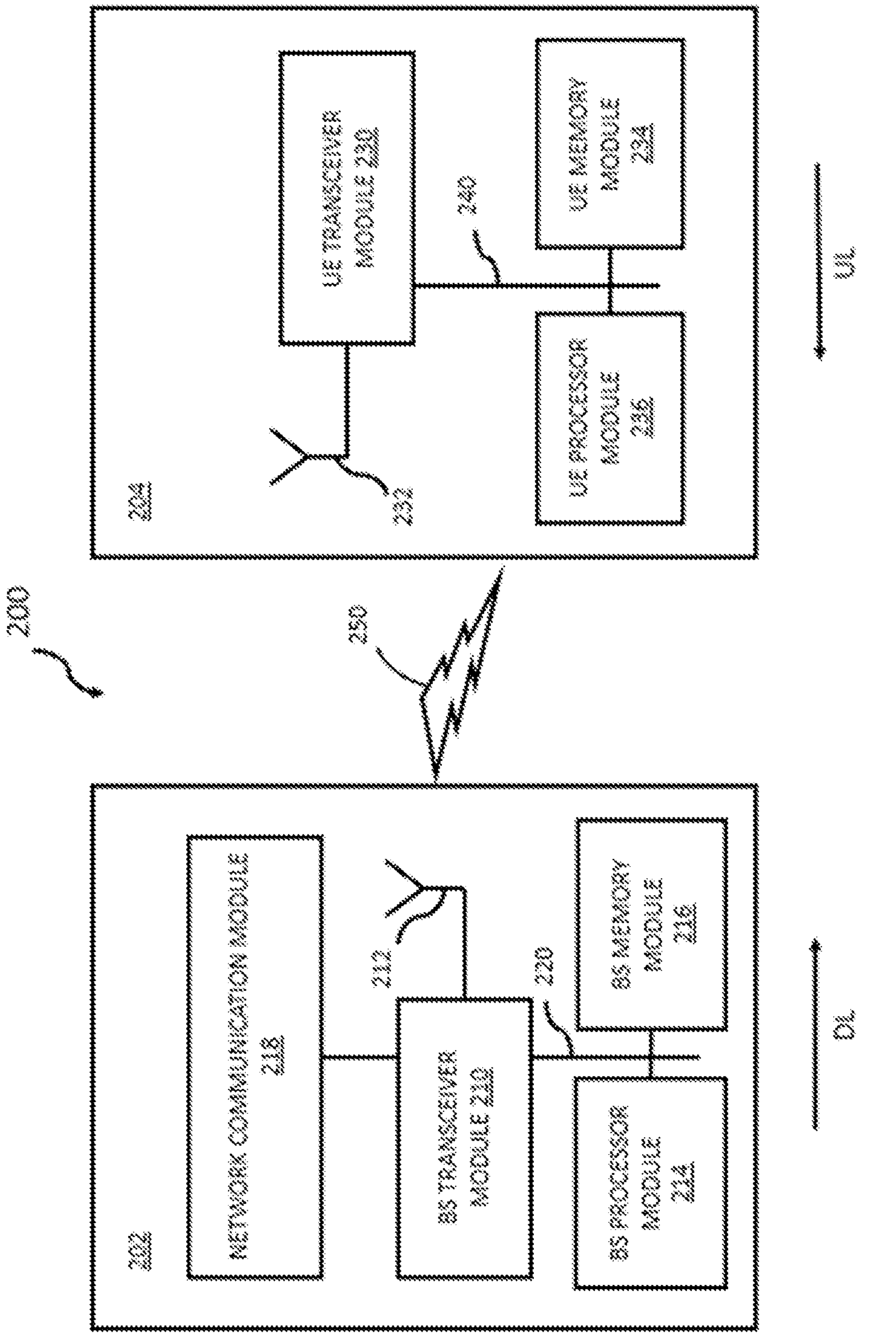
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Determining Beam Failure Recovery Information

In certain systems (e.g., Release 16 and/or other systems), radio resource control (RRC) signaling may be used to reconfigure a reference signal for beam failure detection (q0) and/or a set of candidate beams (q1). The usage of RRC signaling (e.g., to reconfigure the q0 and/or q1) may cause the q0 and/or q1 to be inconsistent/incongruous/incompatible with a current physical downlink control channel (PDCCH) beam. For example, the PDCCH beam can be updated via media access control control element (MAC-CE) signaling. The updated beam can be applied after 3 ms (or other time instances). In some embodiments, RRC signaling may be used to update the q0 and/or q1 and ensure the q0 and/or q1 are consistent with the updated beam. However, in certain embodiments, the updated q0 and/or q1 can be applied after 10 ms (or other time instances). Therefore, the q0 and/or q1 may be inconsistent with the PDCCH beam before the updated q0 and/or q1 takes effect. In other words, the beam failure recovery (BFR) procedure may be invalid/inapplicable/inaccurate. The systems and methods presented herein provide a novel approach for an enhanced dynamic q0 and/or q1 configuration or update method.

Certain systems, such as 5G new radio (NR), may use/enable/introduce analog beam-forming in mobile communications. Analog beam-forming techniques may increase/enhance the robustness of high frequency communications. However, certain factors, such as a rotation of a wireless communication device (e.g., a UE, a terminal, and/or a served node) and/or certain barriers, may cause one or more scenarios. For example, the one or more scenarios may include a degradation/deterioration of a current beam quality and/or a current beam ceasing to work/function. In some embodiments, the one or more scenarios may correspond to a beam failure. A beam failure may indicate/specify that a current quality of a beam (e.g., received beam) of a downlink channel (e.g., a PDCCH) is inadequate. A degraded/inadequate/deteriorated beam quality may affect the quality of a current downlink (DL) transmission.

Certain systems (e.g., Release 15 and/or other systems) may use/enable/introduce a beam failure recovery (BFR) procedure to handle (or respond to) one or more beam failures. A BFR may include at least four steps/operations: beam failure detection (BFD), new beam identification (NBI), beam failure recovery request (BFRQ) and/or beam recovery response (BRR). In BFD, RRC signaling may configure the wireless communication device with a set of periodic reference signals (RSs). The set of periodic RSs can be referred to as a BFD reference signal (RS) and/or q0. In some embodiments, the wireless communication device may assess/analyze a radio link quality (according to the q0) against a configured/predetermined threshold. If the radio link quality is poor/inadequate (e.g., worse than the configured threshold) for N consecutive times, a beam failure may be declared. In NBI, the wireless communication device may be configured with a set of periodic RSs via RRC signaling. The set of periodic RSs can be used as candidate beams. The set of periodic RSs may be referred to as a NBI RS and/or q1. If a beam failure is declared/detected, the wireless communication device may find/detect/identify a new/novel beam (e.g., an index of a periodic RS). The new/novel beam may have one or more corresponding physical layer reference signal received power (L1-RSRP) measurements. The one or more corresponding L1-RSRP measurements may be larger than or equal to a configured threshold in the q1. In BFRQ, the wireless communication device may report/inform/provide/specify/indicate/communicate the new beam to a wireless communication node (e.g., a ground terminal, a base station, a gNB, an eNB, a transmission-reception point (TRP), or a serving node) in the allocated uplink (UL) channel resources.

In BRR, the wireless communication device may monitor/assess the next/following PDCCH by using (or according to) the new beam. However, the q0 and/or q1 may only be reconfigured via RRC signaling, which may cause the q0 and/or q1 to be inconsistent with the current PDCCH beam. For example, the PDCCH beam can be updated via MAC-CE signaling. The updated beam can be applied after 3 ms (or other time instances). In some embodiments, RRC signaling may be used to update the q0 and/or q1 and ensure the q0 and/or q1 are consistent with the updated beam. However, in certain embodiments, the updated q0 and/or q1 can be applied after 10 ms (or other time instances). Therefore, the q0 and/or q1 may be inconsistent with the PDCCH beam before the updated q0 and/or q1 takes effect. In other words, the beam failure recovery (BFR) procedure may be invalid/inapplicable/inaccurate. The systems and methods presented herein provide a novel approach for an enhanced dynamic q0 and/or q1 configuration or update method.

In some embodiments of the present disclosure, a beam state may include or correspond to a QCL state, QCL assumption, RS, transmission configuration indicator (TCI) state and/or spatial relation information (spatialRelationInfo). A QCL and/or TCI state may comprise one or more reference RSs (e.g., QCL RSs) and/or one or more corresponding QCL type parameters. The one or more QCL type parameters may include at least one of the following: Doppler spread, Doppler shift, delay spread, average delay, average gain, and/or spatial parameter. In some embodiments, a QCL type may include or correspond to QCL-TypeD (or other QCL types). The QCL-TypeD may be used to represent/specify/indicate a same or quasi-co spatial parameter between a targeted RS/channel and one or more reference QCL-TypeD RSs. In some embodiments, a QCL type may include or correspond to a QCL-TypeA (or other QCL types). The QCL-TypeA may be used to represent/specify/indicate a same and/or quasi-co Doppler shift, Doppler spread, average delay, and/or delay spread between a targeted RS/channel and one or more reference QCL-TypeA RSs. In some embodiments, a QCL type may include or correspond to a QCL-TypeC. The QCL-TypeC may be used to represent a same or quasi-co Delay shift and/or average delay between a targeted RS/channel and one or more reference QCL-TypeC RSs.

In some embodiments, the spatial relation information may comprise one or more reference RSs (e.g., spatial RS). The spatial information comprising one or more reference RSs can be used to represent a same or quasi-co spatial relation between a targeted RS/channel and one or more reference RSs. In some embodiments, QCL-TypeD may include or correspond to a spatial parameter and/or a spatial Rx parameter.

In some embodiments, a beam may include or correspond to a QCL assumption, spatial relation and/or spatial filter. In some embodiments, QCL and/or QCL assumption may include at least one of the following: Doppler spread, Doppler shift, delay spread, average delay, average gain, and/or spatial parameter. In some embodiments, a spatial relation and/or spatial filter can correspond to a wireless communication side (e.g., UE-side) and/or a wireless communication node side (e.g., gNB-side). A spatial filter may refer to a spatial domain transmission filter and/or spatial domain filter.

In some embodiments, a codepoint may occur A bits in a downlink information (DCI), wherein A is a positive integer. In some embodiments, each codepoint may correspond to an activated beam state. For example, a codepoint can be a TCI codepoint occurring 3 bits in the DCI. In some embodiments, each TCI codepoint (e.g., 000, 001, . . . , 111) may correspond to an activated beam state applicable to a DL signal. In some embodiments, a control resource set (CORESET) group index may include or correspond to a CORESETPoolIndex. In some embodiments, a carrier component (CC) may include or correspond to a serving cell and/or bandwidth part (BWP) of a CC. In some embodiments, a CC group may include or correspond to a group of one or more CCs. The CC group can be configured by a higher layer configuration, such as RRC signaling. In some embodiments, "A is associated with B" may indicate/specify that A and B have a direct or indirect relationship/association. For example, "A is associated with B" may indicate that A (or B) can be determined according to (or based on) B (or A).

In certain systems (e.g., Release 17 and/or other systems), the PDCCH beam can be updated by (or according to) a MAC-CE signal and/or DCI. The systems and methods presented herein provide an effective approach for obtaining/acquiring/receiving the q0 and/or q1 to maintain consistency between the PDCCH beam and the q0 and/or q1. In some embodiments, the wireless communication device may determine/configure at least a q0 and/or q1 according to (or based on) a first information. The first information may be activated/enabled/provided/specified by a first activation signaling/command. The first information may include at least one of: an indication of a first RS, at least one beam state (e.g., TCI state), and/or at least one codepoint. The first activation signaling/command may include at least one of a MAC-CE signaling and/or a DCI signaling. The wireless communication device may receive/obtain the first activation signaling from the wireless communication node.

In one example (e.g., Example-1), the wireless communication device may be provided with a q0 and/or q1 by a MAC-CE signaling. The MAC-CE signaling may include/provide/indicate/specify a first information, such as a resource identifier (ID) of one or more first RSs. In other words, the first RS(s) can be used as the q0 and/or q1. In some embodiments, the wireless communication device may expect the first RS(s) to meet at least one of the following conditions/characteristics. The first RS(s) may comprise at least one of the following conditions/characteristics: a DL RS, a periodic RS, a single-port RS, a two-port RS, a CSI-RS, a channel state information reference signal (CSI-RS), a synchronization signal block (SSB), and/or a RS with frequency density equal to 1 or 3 resource elements (REs) per resource block (RB). The first RS(s) may be separate/distinct/different from the q0 and/or q1.

In some embodiments, the at least one beam state of the first information (and/or other first information) may be applied to at least one of: a physical downlink shared channel (PDSCH), a PDCCH, and/or a CSI-RS. In some embodiments, the wireless communication device can determine/configure the q0 and/or q1 according to N beam states from the at least one beam state. In some embodiments, N may correspond to an integer value of at least 1.

In some embodiments, the value of N and/or the maximum value of N can be determined/configured according to (or based on) a UE capability signaling (e.g., provided by the wireless communication device). In certain embodiments, the value of N and/or the maximum value of N can be indicated/specified/provided/accessed via a MAC-CE signaling and/or a RRC signaling. The MAC-CE signaling and/or RRC signaling may correspond to the first activation signaling. In some embodiments, the MAC-CE signaling and/or RRC signaling may be separate/distinct/different from the first activation signaling. In one example, the value of N may include or correspond to a maximum size of the q0 and/or q1 (e.g., maximum number of RSs that can be supported in a q0 and/or q1). In some embodiments of the present disclosure, the value of N may include or correspond to 2 (or other values).

In some embodiments, the wireless communication device can determine/configure the q0 and/or q1 according to (or based on) one or more QCL RSs in the N beam states from the at least one beam state. The QCL RSs may include at least one of a QCL-TypeD RS and/or a QCL-TypeA RS.

In some embodiments, the N beam states may comprise beam states with N lowest identifiers (IDs). For instance, the at least one beam state can have N beam states. The N beam states may be selected as the N beam states with the lowest IDs (e.g., the N lowest IDs). The ID may refer or correspond to the ID of the beam state (e.g., a TCI state ID).

In one example (e.g., Example-2), for PDCCH and/or PDSCH beam indication, the wireless communication node may activate at least 8 (or other numbers) TCI states for the wireless communication device. The wireless communication node may activate/enable the at least 8 TCI states by using a MAC-CE signaling (or other types of signaling). The TCI state IDs of the at least 8 TCI states may include or correspond to 2, 6, 8, 15, 45, 78, 81, and/or 101 (in descending order). After receiving the MAC-CE signaling, the wireless communication device can determine/configure the q0/q1 according to (or based on) the first (or last) 2 TCI states with the lowest ID (e.g., TCI state 2, TCI state 6, and/or other TCI states) from the at least 8 TCI states. In some embodiments, the q0/q1 can include a QCL-TypeD RS in TCI state 2 (or other TCI states) and a QCL-TypeD RS in TCI state 6 (or other TCI states).

In some embodiments, the N beam states can be selected/identified/indicated/specified/determined from the at least one beam state via a MAC-CE signaling and/or a RRC signaling. The MAC-CE signaling and/or RRC signaling may correspond to the first activation signaling. In some embodiments, the MAC-CE signaling and/or RRC signaling may be separate/distinct/different from the first activation signaling. For example (e.g., Example-3), the q0 may include at least two RSs in a given time instant. Therefore, the wireless communication node may indicate/specify/provide a TCI state for the wireless communication device using a DCI signaling (or other types of signaling). The beam corresponding to the QCL-TypeD RS in the indicated TCI state may be different/distinct from the one or more beams corresponding to the RSs in the q0. The wireless communication device may apply the (new) beam (or the QCL-TypeD RS) in the q0. In some embodiments, the wireless communication device may determine to ignore at least one (old) beam (or RS) in the q0.

In some embodiments, at least one RS in the q0 and/or q1 may be associated/related with the at least one codepoint. In some embodiments, the wireless communication device may determine/configure the q0 and/or q1 according to (or based on) one or more beam states. The one or more beam states may correspond to M codepoint(s) from the at least one codepoint. In some embodiments, M may be an integer value of at least 1. The q0 and/or q1 can be associated/related with the at least one codepoint. Therefore, the wireless communication device can determine/configure the q0 and/or q1 according to (or based on) the one or more beam states corresponding to M codepoint(s) from the at least one codepoint. In some embodiments, the value and/or maximum value of M may be determined according to a signaling indicating UE capability. In certain embodiments, the value and/or maximum value of M may be indicated/specified via a MAC-CE signaling and/or a RRC signaling. The MAC-CE signaling and/or RRC signaling may correspond to the first activation signaling. In some embodiments, the MAC-CE signaling and/or RRC signaling may be separate/distinct/different from the first activation signaling. In some embodiments of the present disclosure, the value of M may include or correspond to 2 (or other values).

In some embodiments, a RS in the q0 and/or q1 can be associated/related with the at least one codepoint. For example, each RS in the q0 may be associated with a codepoint.

In some embodiments, the M codepoint(s) may comprise codepoints with M lowest bit values. The M codepoint(s) may be selected as the M codepoint(s) with the lowest bit values (e.g., the M lowest bit values). In one example, for codepoint "001" and "011", the bit values may correspond to 1 (e.g., $2^0$) and 3 (e.g., $2^1+2^0$) respectively.

Referring now to FIG. 3, depicted is a representation 300 of an example association between the q0 and/or q1 and a TCI codepoint. In one example (e.g., Example-4), a first RS (e.g., RS 1) and/or a second RS (e.g., RS 2) in the q0 and/or q1 may be associated/related with at least two TCI codepoints. The at least two TCI codepoints may correspond to the first two TCI codepoints with the lowest bit value (e.g., 000 and/or 001) in the DCI. In a given time instant, the wireless communication device may be activated/enabled with at least 8 (or other numbers) TCI states (e.g., TCI state 5, TCI state 8, TCI state 15, and/or other TCI states) applied for PDSCH and/or PDCCH beam indication by a MAC-CE signaling (or other types of signaling). Each TCI codepoint (e.g., codepoint 000, codepoint 001, codepoint 010, and/or other codepoints) may correspond to an activated TCI state. The wireless communication device can determine the q0 and/or q1 according to (or based on) TCI state 5 (e.g., corresponding to codepoint 000) and/or TCI state 8 (e.g., corresponding to codepoint 001). The first RS (e.g., RS 1) in the q0 and/or q1 may include or correspond to the QCL-TypeD RS (or other types of QCL RSs) in the TCI state 5. The second RS (e.g., RS 2) in the q0 and/or q1 may include or correspond to the QCL-TypeD RS (or other types of QCL RSs) in the TCI state 8.

In some embodiments (e.g., Example-3), M codepoint(s) can be selected (or indicated) from the at least one codepoint via a MAC-CE signaling and/or a DCI signaling.

In some embodiments, the at least one beam state may include or correspond to the beam state with the lowest ID corresponding to the at least one codepoint.

In some embodiments, the at least one beam state may include or correspond to the Pth beam state corresponding to the at least one codepoint. The value of P can be determined/configured according to (or based on) a first index associated with the q0 and/or q1.

In one example (e.g., Example-5) with one or more transmit receive points (TRPs) (e.g., TRP-0 and/or TRP-1), each TCI codepoint (e.g., codepoint 000, codepoint 001, and/or other codepoints) may correspond to at least two activated TCI states (e.g., TCI state 5, TCI state 9, TCI state 8, TCI state 12, and/or other TCI states). The first TCI state may be applied/used for beam indication of a PDSCH/PDCCH transmission of TRP-0. The second TCI state may be applied/used for beam indication of a PDSCH/PDCCH transmission of TRP-1. The q0 and/or q1 applied to TRP-0 may be associated with a first index. The first index may include or correspond to a TRP-ID, a beam failure index, a beam failure recovery index, and/or other indices. The value of the first index may be set to 0 (or other values). The q0 and/or q1 applied to TRP-1 may be associated with a first index, wherein the value of the first index may be set to 0 (or other values). Therefore, the first index may identify the TRP corresponding to q0. As shown in FIG. 4, the wireless communication device can determine/configure the q0 and/or q1 applied to TRP-0 according to a first TCI state. The first TCI state may correspond to the first two codepoints (e.g., TCI state 5 and/or TCI state 8). Furthermore, the wireless communication device can determine the q0 and/or q1 applied to TRP-1 according to (or based on) a second TCI state. The second TCI state may correspond to the first and/or second codepoint (e.g., TCI state 9 and/or TCI state 12). If the q0 is unassociated with the first index, the wireless communication device can determine the q0 and/or q1 according to (or based on) the TCI states with the lowest IDs. The TCI states with the lowest IDs may correspond to the first two codepoints (e.g., TCI state 5 and/or TCI state 8).

Figure 5:
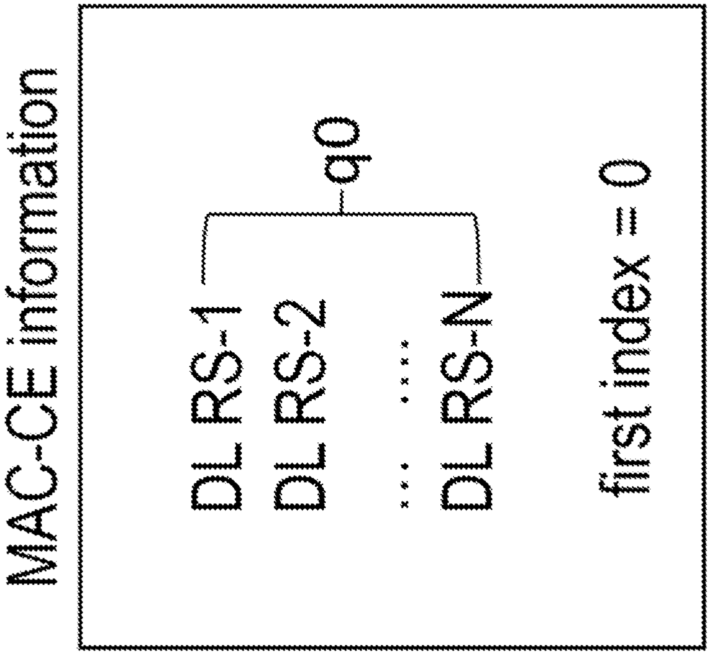
FIG. 5 illustrates an example MAC-CE information configuration, in accordance with some embodiments of the present disclosure.

In one example (e.g., Example-6), the q0 and/or q1 may be associated/related with a first index (e.g., a CORESET group index). The first information (e.g., at least one beam state and/or at least one codepoint) may be associated/related with the first index. In some embodiments, the wireless communication device may determine/configure the q0 and/or q1 according to (or based on) the first information. The wireless communication device may determine the q0 in order to detect a beam failure using one or more beams (e.g., RSs) in the q0. The wireless communication device may determine the q1 in order to identify/select at least one new beam (e.g., RS) from the q1 when beam failure occurs. In some embodiments, the first index may include or correspond to a TRP-ID, a beam failure index, a beam failure recovery index, and/or a CORESET group index. Referring now to FIG. 5, depicted is a representation 500 of an example MAC-CE information. In certain embodiments with one or more TRPs (e.g., TRP-0 and/or TRP-1), the wireless communication device may receive/obtain a MAC-CE information (or other information). The MAC-CE information may include/provide/specify a set of one or more DL RSs (e.g., first information), the first index, and/or other information. The set of one or more DL RSs (e.g., DL RS-1, DL RS-2, . . . , DL-RS N) may correspond to (or be associated to) the first index. In certain embodiments of the present disclosure, the value of the first index may include or correspond to 0 (or other values). In some embodiments, the set of one or more DL RSs (or other first information) can be used as the q0. Therefore, the wireless communication device can determine/configure the q0 applied to TRP-0 (or other TRPs) according to (or based on) the q0 that corresponds to the first index (e.g., a first index with a value of 0). The first index (e.g., corresponding to the q0) may specify/indicate to which TRP (e.g., TRP-0) the corresponding q0 is applied to.

Figure 6:
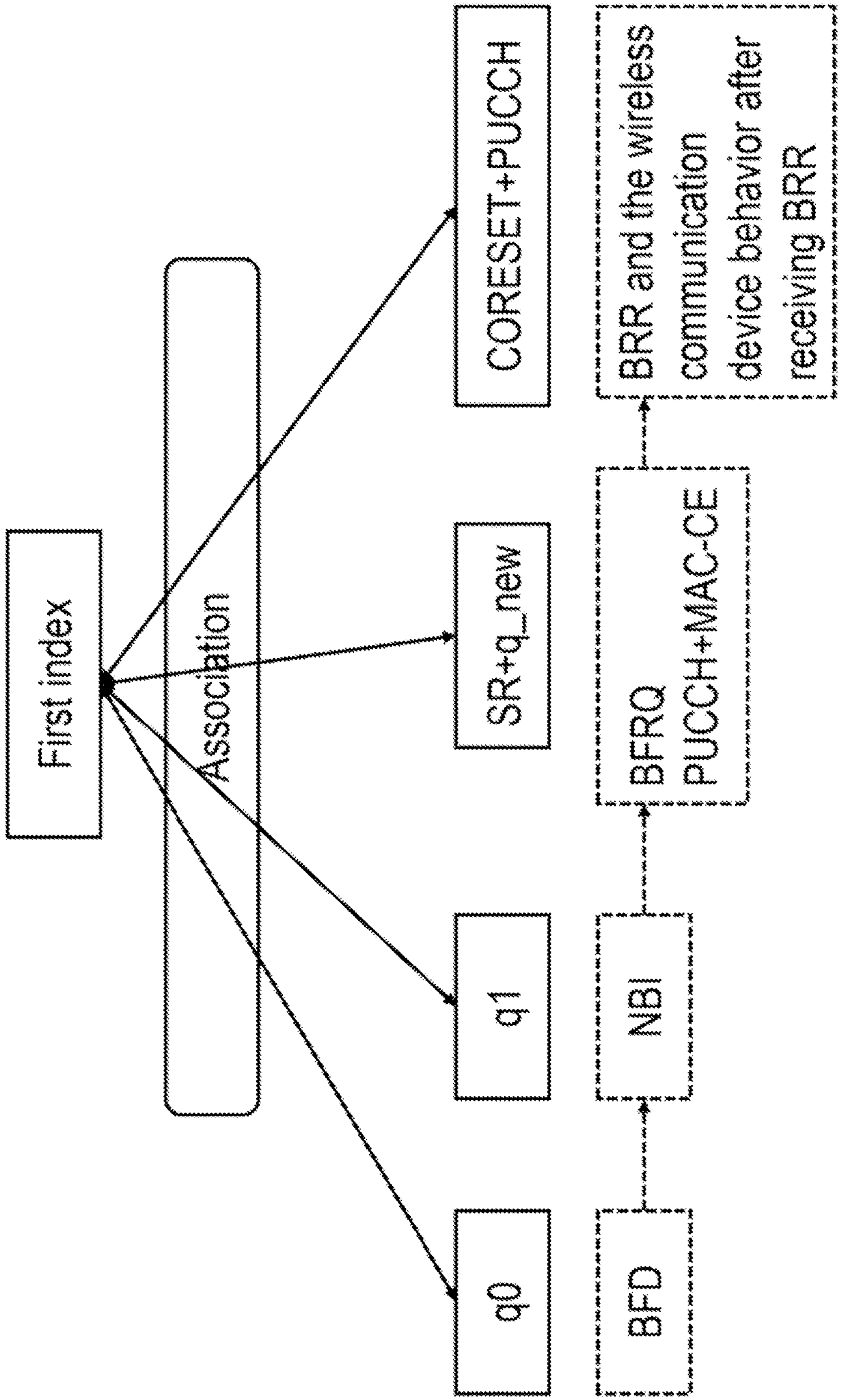
FIG. 6 illustrates example associations of a first index, in accordance with some embodiments of the present disclosure.

In some embodiments, the q0 and/or q1 may be associated with a first index. As shown in FIG. 6, in a BFRQ procedure, a scheduling request (SR) or SR ID and/or a q_new (e.g., new beam indicated in a NBI step) may be associated with the first index. A determination of a new beam (q_new) may indicate/specify that a RS from the q1 is determined, wherein the RS has a new beam. The wireless communication device may report/specify the RS from the q1. The RS from the q1 may be associated with the first index. In some embodiments, the PUCCH resource carrying/including the SR and/or the MAC-CE carrying/including the q_new may be associated/related with the first index. In a BRR procedure, one or more CORESETs monitored by the wireless communication device and/or one or more PUCCH resources may be associated with the first index. In some embodiments with one or more TRPs, the first index may include/indicate/provide/specify a TRP-ID, a beam failure index, a beam failure recovery index, and/or a CORESET group index. In a given CC and/or bandwidth part (BWP), the wireless communication device may be configured with at least two q0 and/or at least two q1 during a BFD and/or NBI procedure. The at least two q0 may be associated with a first index that has a value of 0 (or other values). The at least two q1 may be associated with a first index that has a value of 1 (or other values). The at least two q0 and/or q1 (e.g., corresponding/associated to the first index=0 and/or first index=1) may be applied to TRP-0 and/or TRP-1. For example, the wireless communication device may detect/identify a beam failure by using the q0 corresponding to the first index=0. If the wireless communication device detects/identifies a beam failure, the wireless communication device may determine a new beam (q_new) from the q1 corresponding to the first index=0. Furthermore, the wireless communication device may transmit/send/broadcast a SR associated with the first index (e.g., first index=0) to the wireless communication node. In some embodiments, the wireless communication device may transmit the SR in the PUCCH resource associated with the first index (e.g., first index=0). The wireless communication device may use a MAC-CE (or other signaling) to report/communicate/provide the q_new associated with the first index (e.g., first index=0). In some embodiments, the wireless communication device may report/communicate/specify/inform the q_new in the MAC-CE associated with the first index=0. In the BRR procedure and after receiving BRR, the wireless communication device may monitor PDCCH transmissions in all CORESETs associated with the first index (e.g., first index=0) on a CC (e.g., a current CC, a primary cell (PCell) and/or a secondary cell (SCell) indicated by the MAC-CE). The wireless communication device may monitor the PDCCH transmissions using the same antenna port quasi co-location (QCL) parameters as the ones associated with the q_new. Furthermore, the wireless communication device may transmit/send/broadcast the PUCCH associated with the first index (e.g., first index=0) on a CC (e.g., a PCell, and/or a PUCCH-SCell). The wireless communication device may transmit the PUCCH using a same spatial domain filter as the one corresponding to the q_new for periodic CSI-RS and/or SSB reception.

In some embodiments, after 28 symbols from a last symbol of a PDCCH reception with a DCI scheduling a PUSCH transmission with a same hybrid automatic repeat request (HARQ) process number as for a transmission of a first PUSCH and having a toggled new data indicator (NDI) field value, the wireless communication device may monitor PDCCH occasions in all control resource sets (CORESETs) on one or more secondary cells (SCells) indicated by a MAC-CE using a same antenna port quasi co-location parameters as those associated with the RS. In certain embodiments, after 28 symbols from a last symbol of a PDCCH reception with a DCI scheduling a PUSCH transmission with a same HARQ process number as for a transmission of a first PUSCH and having a toggled NDI field value, the wireless communication device may transmit/send/broadcast/communicate a PUCCH on a PUCCH-SCell using a same spatial domain filter as that corresponding to the RS. The "28 symbols" may be based on a CC having the lowest sub-carrier spacing (SCS). Furthermore, the SCS configuration for the 28 symbols may be the smallest of the SCS configurations of the active DL BWP for the PDCCH reception and of the active DL BWP(s) of all the CCs (e.g., a SCell) indicated by the MAC-CE. For each CC (e.g., a PCell and/or a SCell indicated by the MAC-CE), the SCS configuration for the 28 symbols may be the smallest of the SCS configurations of the active DL BWP for the PDCCH reception and of the active DL BWP(s) of the CC.

Figure 7:
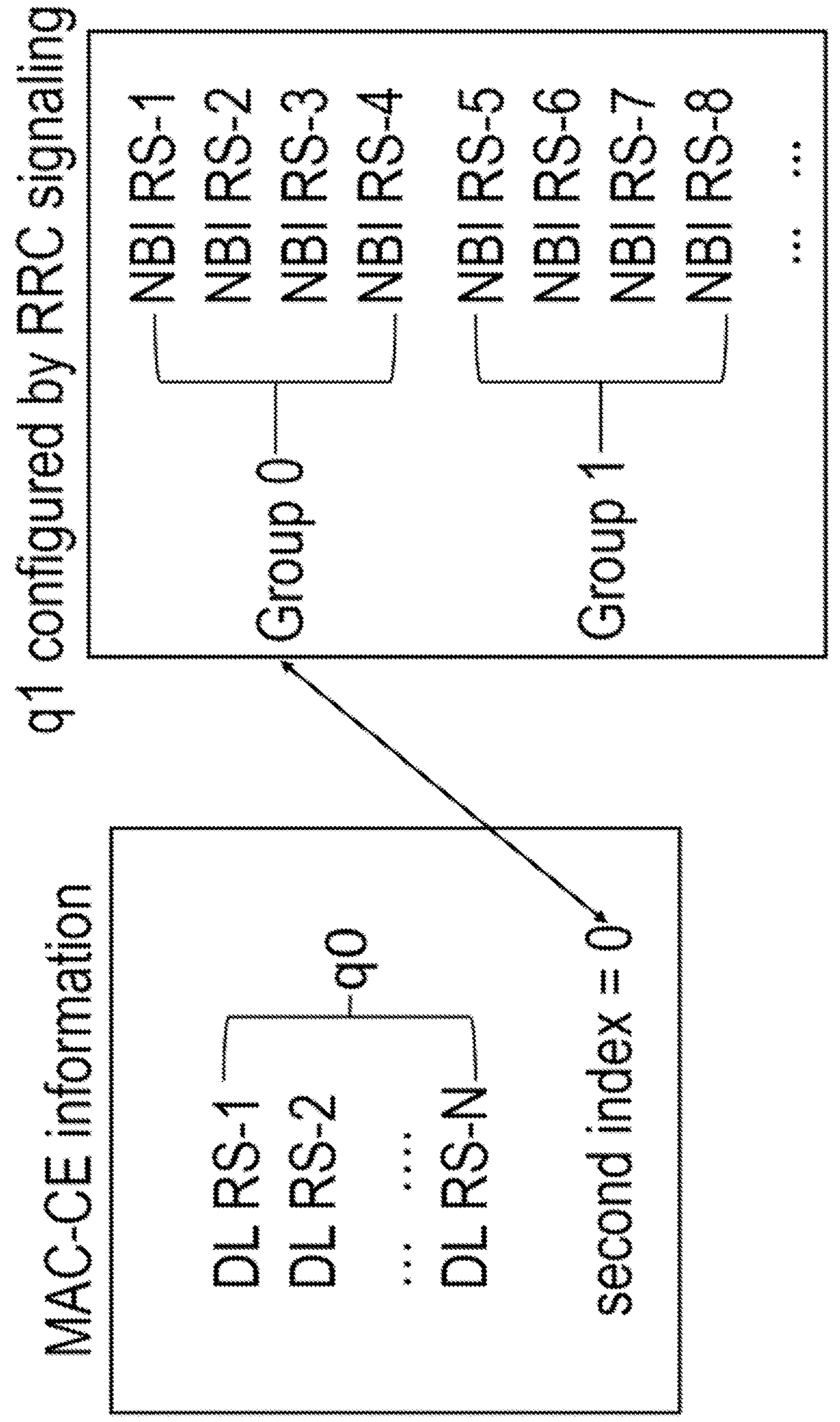
FIG. 7 illustrates example approaches for determining the q1 according to a second index activated by MAC-CE information, in accordance with some embodiments of the present disclosure.

In one example (e.g., Example-8), the q0 may be associated/related with a second index. A first list of RSs can be associated with the second index. In some embodiments, the wireless communication device can determine/configure the first list of RSs according to (or based on) the q0. The wireless communication device may determine/configure the q1 according to (or based on) the first list of RSs (e.g., associated with the second index). For example, up to 128 (or other numbers) RSs may be supported in the q1. If the wireless communication device searches for (or identifies) a new beam among the many candidate beams every time a beam failure occurs, the latency can increase substantially. Therefore, the NBI RSs (e.g., q1) can be divided/partitioned/grouped into one or more groups, as shown in FIG. 7. Each group of the one or more groups of NSI RSs (or q1) may correspond to (or be associated with) a group ID (e.g., the second index). For example, a second index with a value of 0 may refer to (or indicate) a group 0. In some embodiments, the wireless communication device may receive/obtain a MAC-CE as shown in FIG. 7. The MAC-CE may include or specify a set of one or more DL RSs (e.g., a q0), a second index (e.g., second index with a value of 0), and/or other information. If the wireless communication device receives a MAC-CE (e.g., a MAC-CE as shown in FIG. 7) and detects/identifies a beam failure by using (or according to) the q0, the wireless communication device may find/detect/identify/select a new beam (e.g., NBI RS-1, NBI RS-2, NBI RS-3, and/or others) in/among the NBI RSs (q1). The new beam may correspond to (or be a part of) group 0 (or other groups associated to the second index). In other words, the wireless communication device may determine/identify/select the q1 according to (or based on) the second index activated by the MAC-CE, thereby reducing/decreasing the latency of the NBI procedure.

In one example (e.g., Example-9), the wireless communication device can determine the q0 and/or q1 according to (or based on) the QCL-TypeD RS in the beam state. In some embodiments, the q0 and/or q1 can be applied to a first CC. In some embodiments, a QCL-TypeD RS in the at least one beam state may be in a second CC. In some embodiments, the second CC may be separate/distinct/different from the first CC. When a QCL-TypeD RS in the at least one beam state is in the second CC and/or the second CC is different from the first CC, the q0 and/or q1 can be determined according to the QCL-TypeA RS in the at least one beam state.

In one example (e.g., Example-10), the wireless communication device can support a maximum of 32 (or other numbers) CCs in a carrier aggregation (CA) deployment. Each CC may be provided/specified/indicated with an independent q0 and/or q1, thereby causing an increased amount of unnecessary RS resource overhead. In some embodiments, one or more CCs (e.g., all CCs) in a CC group (e.g., configured by RRC) may have a same/similar/corresponding beam. Therefore, the CCs may have at least one identical q0 and/or q1. Furthermore, the q0 and/or q1 may be configured in the PCell in the CC group. In order to update the q0 and/or q1, the wireless communication device may receive/obtain a MAC-CE. The MAC-CE may include a new q0/q1 and/or a CC index. The value of the CC index may point/refer to the PCell. The new q0 and/or q1 may be applied to one or more CCs (e.g., all CCs) in the same group as the PCell. The wireless communication device can determine a q0 and/or q1 of a first CC according to (or based on) a q0 and/or q1 of a second CC. The first CC and the second CC may belong to the same CC group. Furthermore, the second CC can be a PCell. The q0 and/or q1 may be configured in the second CC. The one or more examples of the present disclosure that are applicable to obtaining a q0 may be applicable to obtaining a q1 (and vice versa).

In some embodiments, the wireless communication device may send/transmit/broadcast a PUCCH with hybrid automatic repeat request acknowledgement (HARQ-ACK) information in a slot n corresponding to a PDSCH carrying the first activation signaling (e.g., MAC-CE and/or other types of signaling). The list of RSs in the q0 and/or q1 may be applied starting from a first slot that is after slot $$n + 3N_{slot}^{subframe,\mu}$$

in a subframe. The parameter μ may indicate/specify/provide the SCS configuration for the PUCCH. The parameter N may indicate/specify/provide a number of slots in the subframe.

A. Methods for Determining Beam Failure Recovery Information.

Figure 8:
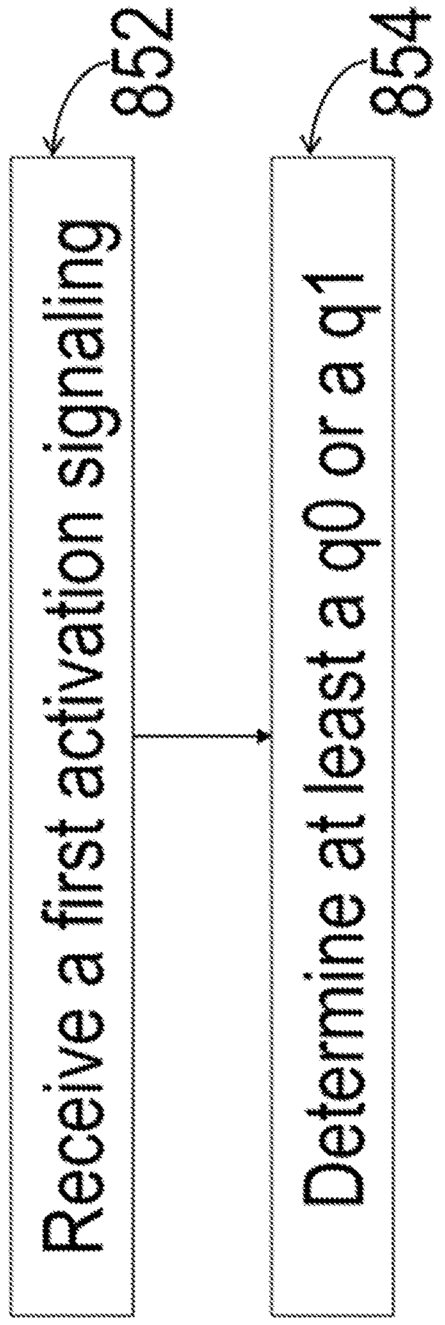
FIG. 8 illustrates a flow diagram of an example method for determining beam failure recovery information, in accordance with an embodiment of the present disclosure.

FIG. 8 illustrates a flow diagram of a method 850 for determining beam failure recovery information. The method 850 may be implemented using any of the components and devices detailed herein in conjunction with FIGS. 1-7. In overview, the method 850 may include receiving a first activation signaling (852). The method 850 may include determining at least a q0 or a q1 (854).

Referring now to operation (852), and in some embodiments, a wireless communication device (e.g., a UE) may receive/obtain/acquire a first activation signaling from a wireless communication node (e.g., gNB). The wireless communication node may send/transmit/broadcast/communicate the first activation signaling from the wireless communication device. The first activation signaling may include a first information. The first activation signaling may comprise a medium access control control element (MAC CE) signaling, a downlink control information (DCI) signaling, and/or other types of signaling. In some embodiments, the first information may include at least one of: an indication of a first RS, at least one beam state (e.g., a TCI state), and/or at least one codepoint.

Referring now to operation (854), and in some embodiments, the wireless communication device may determine/configure at least a q0 and/or a q1 according to (or based on) the first information (e.g., indication of a first RS, at least one beam state, and/or others). The first information can be activated/enabled by a first activation command/signaling (e.g., MAC-CE signaling and/or DCI signaling). The wireless communication node may cause the wireless communication device to determine at least a q0 and/or a q1 according to (or based on) the first information. In some embodiments, q0 may include or correspond to a list of reference signals (RSs) for assessing radio link quality. The q1 may include or correspond to a list of RSs for determining a RS to be reported. In some embodiments, the first RS may comprise at least one of: a downlink (DL) RS, a periodic RS, a single-port RS, a two-port RS, a channel state information reference signal (CSI-RS), a synchronization signal block (SSB), and/or a RS with frequency density equal to 1 or 3 resource elements (REs) per resource block (RB).

In some embodiments, the at least one beam state may be applied to at least one of: a physical downlink shared channel (PDSCH), a physical downlink control channel (PDCCH), and/or a channel state information reference signal (CSI-RS). In some embodiments, the wireless communication device may determine/configure the q0 and/or the q1 according to (or based on) N beam states from the at least one beam state. In some embodiments, N may correspond to an integer value of at least 1. In some embodiments, the N beam states may comprise beam states with N lowest identifiers (IDs). For instance, the at least one beam state can have N beam states. The N beam states may be selected as the N beam states with the lowest IDs (e.g., the N lowest IDs). The ID may refer or correspond to the ID of the beam state (e.g., a TCI state ID). In some embodiments, the N beam states can be selected/indicated/identified/specified from the at least one beam state. The N beam states may be selected/indicated via a MAC-CE signaling, DCI signaling, and/or other types of signaling. For example, the wireless communication node may indicate/specify/provide at least one TCI state for the wireless communication device using DCI signaling. In some embodiments, the wireless communication device may determine/configure the q0 and/or the q1 according to (or using) one or more QCL RSs (e.g., QCL-TypeD RS and/or QCL-TypeA RS) in the N beam states from the at least one beam state.

In some embodiments, the value and/or maximum value of N can be determined/configured according to (or based on) a UE capability signaling (e.g., provided by the wireless communication device) and/or other types of signaling. In some embodiments, the value and/or maximum value of N can be indicated/specified/provided via MAC-CE signaling, RRC signaling, and/or other types of signaling. For example, the value of N may correspond to a maximum size of the q0 and/or the q1. In some embodiments, N may have a value of 2 (or other values). In some embodiments, the wireless communication device may determine the q0 and/or q1 according to (or based on) one or more beam states. The one or more beam states may correspond to (or be associated with) M codepoints from the at least one codepoint. For instance, given a TCI codepoint, the wireless communication device may identify/determine at least one beam state corresponding to at least one TCI codepoint. Furthermore, the wireless communication device may identify one or more RSs in (or corresponding to) the at least one beam state. The one or more RSs may be included in (or be part of) the q0 and/or q1. In some embodiments, the M can be an integer value of at least 1 (or other values). The q0 and/or the q1 may be associated/related with the at least one codepoint. For example, each RS in the q0 may be associated/related with at least one codepoint.

In some embodiments, the M codepoints may comprise codepoints with M lowest bit values. For example, M codepoints may be selected as the M codepoints with the lowest bit values (e.g., the M lowest bit values). In some embodiments, the M codepoints may be selected/indicated/determined/specified from the at least one codepoint. The M codepoints may be selected/indicated via a MAC-CE signaling, DCI signaling, and/or other types of signaling. In some embodiments, the value of M and/or the maximum value of M can be determined/configured according to (or based on) a signaling indicating UE capability and/or other information. In some embodiments, the value of M and/or the maximum value of M may be indicated/specified/provided/accessed via a MAC-CE signaling, RRC signaling, and/or other types of signaling. In some embodiments, the at least one beam state may comprise a beam state with a lowest identifier (ID) corresponding to the at least one codepoint. In some embodiments, the at least one beam state may include or correspond to a Pth beam state corresponding to the at least one codepoint. The value of P can be determined/configured according to (or based on) a first index. The first index may be associated/related with the q0 and/or the q1. In some embodiments, the wireless communication device may determine/configure the q0 or the q1 according to one or more QCL RSs. The one or more QCL RSs may be in the one or more beam states corresponding to the M codepoints.

In some embodiments, the q0 and/or the q1 may be associated/related with a first index. The first information (e.g., the at least one beam state) may be associated with the first index. In some embodiments, the q0 and/or the q1 may be determined according to (or based on) the first information. For example, the wireless communication device can determine the q0 applied for a TRP (e.g., TRP-0) according to (or based on) the q0 that corresponds to the first index (e.g., first index=0). Therefore, the first index may refer/indicate/specify to which TRP the corresponding q0 is applied to. In some embodiments, the first index may include or correspond to at least a control resource set (CORESET) group index. In some embodiments, the wireless communication device may report/communicate/indicate/inform/specify the RS from the q1. The RS may be associated/related with the first index. The wireless communication device may monitor a PDCCH (or other DL channels) in all CORESETs associated/related with the first index using one or more same antenna port QCL parameters as those associated with the RS. In some embodiments, the wireless communication device may transmit/send/communicate/broadcast the PUCCH associated with the first index using a same spatial domain filter as that corresponding to the RS.

In some embodiments, the q0 may be associated with a second index. A first list of RSs may associated with the second index. In some embodiments, the wireless communication device may determine/configure the first list of RSs according to (or based on) the q0. The wireless communication device may determine/configure the q1 according to (or based on) the first list of RSs. In some embodiments, the q0 and/or q1 may applied to a first CC. A QCL-TypeD RS in the at least one beam state may be in a second CC. In some embodiments, the second CC may be different/separate/distinct from the first CC. When a QCL-TypeD RS in the at least one beam state is in a second CC and/or the second CC is different from the first CC, the q0 and/or the q1 may be determined according to (or based on) a QCL-TypeA RS in the at least one beam state. In some embodiments, the wireless communication device may transmit/send/broadcast a PUCCH with HARQ-ACK information in a slot n. The slot n may correspond to a PDSCH carrying the first activation signaling. In some embodiments, the wireless communication device may apply the list of RSs in the q0 and/or the q1 starting from a first slot that is after slot $$n + 3N_{slot}^{subframe,\mu}$$

in a subframe. In some embodiments, the parameter μ may indicate or specify a subcarrier spacing (SCS) configuration for the PUCCH. In some embodiments, the parameter N may indicate or specify a number of slots in the subframe.

After 28 symbols from a last symbol of a PDCCH reception with a DCI scheduling a PUSCH transmission with a same HARQ process number as for a transmission of a first PUSCH and having a toggled a NDI field value, the wireless communication device may monitor PDCCH occasions in all CORESETs on one or more SCells indicated by a MAC-CE using a same antenna port quasi co-location parameters as those associated with the RS. In some embodiments, after 28 symbols from a last symbol of a PDCCH reception with a DCI scheduling a PUSCH transmission with a same HARQ process number as for a transmission of a first PUSCH and having a toggled a NDI field value, the wireless communication device may transmit/send/broadcast/communicate PUCCH on a PUCCH-SCell using a same spatial domain filter as that corresponding to the RS. In some embodiments, a SCS configuration for the 28 symbols may include or correspond to a smallest of SCS configurations of an active DL BWP for the PDCCH reception and of one or more active DL BWPs of the SCells indicated by the MAC-CE.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device from a wireless communication node, a first activation signaling comprising a medium access control control element (MAC CE) signaling, the first activation signaling including a first information; and determining, by the wireless communication device, at least a q0, according to the first information, wherein the q0 is associated with a first index, wherein the first information indicates a set of one or more downlink (DL) reference signals (RSs) corresponding to the first index, and wherein the q0 comprises the set of one or more DL RSs for beam failure assessment.

2. The method of claim 1, wherein the first information includes: an indication of a first RS.

3. The method of claim 2, wherein the first RS comprises: a channel state information reference signal (CSI-RS).

4. The method of claim 1, wherein a value of the first index corresponds to 0 or another defined value.

5. The method of claim 1, wherein the first index corresponds to a transmission-reception point (TRP) identifier (ID), the first index corresponds to a TRP the q0 is applied to, or the q0 is applied to a TRP determined according to the first index value corresponding to the q0.

6. The method of claim 1, wherein the q0 comprises two q0s corresponding to a first index with value 0 and a first index with value 1 respectively, or wherein the q0 comprises two q0s corresponding to a first transmission-reception point (TRP) and a second TRP respectively.

7. A wireless communication device comprising:

at least one processor configured to:

receive, via a receiver from a wireless communication node, a first activation signaling comprising a medium access control control element (MAC CE) signaling, the first activation signaling including a first information; and determine, by the wireless communication device, at least a q0, according to the first information, wherein the q0 is associated with a first index, wherein the first information indicates a set of one or more downlink (DL) reference signals (RSs) corresponding to the first index, and wherein the q0 comprises the set of one or more DL RSs for beam failure assessment.

8. A wireless communication node comprising:

at least one processor configured to:

transmit, via a transmitter to a wireless communication device, a first activation signaling comprising a medium access control control element (MAC CE) signaling, the first activation signaling including a first information; and cause the wireless communication device to determine at least a q0, according to the first information, wherein the q0 is associated with a first index, wherein the first information indicates a set of one or more downlink (DL) reference signals (RSs) corresponding to the first index, and wherein the q0 comprises (i) the set of one or more DL RSs, and (ii) a list of RSs for beam failure assessment.

9. A method comprising:

transmitting, by a wireless communication node to a wireless communication device, a first activation signaling comprising a medium access control control element (MAC CE) signaling, the first activation signaling including a first information; and causing the wireless communication device to determine at least a q0, according to the first information, wherein the q0 is associated with a first index, wherein the first information indicates a set of one or more downlink (DL) reference signals (RSs) corresponding to the first index, and wherein the q0 comprises the set of one or more DL RSs for beam failure assessment.

10. The method of claim 9, wherein the first information includes: an indication of a first RS.

11. The method of claim 10, wherein the first RS comprises:

a channel state information reference signal (CSI-RS).

12. The method of claim 9, wherein a value of the first index corresponds to 0 or another defined value.

13. The method of claim 9, wherein the first index corresponds to a transmission-reception point (TRP) identifier (ID), the first index corresponds to a TRP the q0 is applied to, or the q0 is applied to a TRP determined according to the first index value corresponding to the q0.

14. The method of claim 9, wherein the q0 comprises two q0s corresponding to a first index with value 0 and a first index with value 1 respectively, or wherein the q0 comprises two q0s corresponding to a first transmission-reception point (TRP) and a second TRP respectively.

* * * * *